US012684398B2

(12) United States Patent　　(10) Patent No.: US 12,684,398 B2

Liu et al.　　(45) Date of Patent: Jul. 14, 2026

(54) RADIO FREQUENCY CHANNEL MANAGEMENT METHOD, APPARATUS, AND RELATED DEVICE

(71) Applicant: HUAWEI TECHNOLOGIES CO., LTD., Shenzhen (CN)

(72) Inventors: Yingda Liu, Shanghai (CN); Maozhi Tao, Shenzhen (CN); Jiangli Luo, Dongguan (CN); Hongbo Gao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 447 days.

(21) Appl. No.: 18/335,982

(22) Filed: Jun. 15, 2023

(65) Prior Publication Data

US 2023/0328576 A1　　Oct. 12, 2023

Related U.S. Application Data

(63) Continuation of application No. PCT/CN2021/135228, filed on Dec. 3, 2021.

(30) Foreign Application Priority Data

Dec. 23, 2020　(CN) .......................... 202011538943.1

(51) Int. Cl.
　　*H04W 28/02*　　(2009.01)
(52) U.S. Cl.
　　CPC ... *H04W 28/0221* (2013.01); *H04W 28/0252* (2013.01)
(58) Field of Classification Search
　　CPC ..... H04W 28/02; H04W 28/06; H04W 72/51; H04W 72/54; H04W 72/04; H04W 72/12;
　　(Continued)

(56) References Cited

U.S. PATENT DOCUMENTS

| 8,804,588 | B2 * | 8/2014 | Lee | H04W 52/0216 |
| | | | | 370/329 |
| 9,008,219 | B2 * | 4/2015 | Zhang | H04B 7/0693 |
| | | | | 375/295 |

(Continued)

FOREIGN PATENT DOCUMENTS

| CN | 101466134 A | 6/2009 |
| CN | 101699904 A | 4/2010 |

(Continued)

OTHER PUBLICATIONS

Yizhe Zhao et al:"Modelling and Performance Analysis of Wireless LAN Enabled byRF Energy Transfer," Nov. 2018, total 17 pages.

(Continued)

*Primary Examiner* — Man U Phan

(57)　　ABSTRACT

A communication device includes a first carrier and a second carrier. In a radio frequency channel management process, the communication device obtains a downlink sub-frame, and determines a target sub-frame in the downlink sub-frame, where both the first carrier and the second carrier allow shutting down a target radio frequency channel of the communication device in a time period corresponding to the target sub-frame. The communication device shuts down the target radio frequency channel in the time period corresponding to the target sub-frame. In this way, an energy-saving effect of the communication device is achieved by performing shutdown control on a radio frequency channel in a time period corresponding to a sub-frame granularity without affecting data communication between the communication device and another device based on each carrier.

12 Claims, 4 Drawing Sheets

(58) Field of Classification Search
CPC ..... H04W 52/14; H04W 52/16; H04W 52/02;
H04W 52/54; H04L 5/00; H04L 25/02;
H04L 27/26; H04L 49/25
USPC ......................................................... 370/230
See application file for complete search history.

(56) References Cited

U.S. PATENT DOCUMENTS

| | | | | |
|---|---|---|---|---|
| 9,014,095 | B2 * | 4/2015 | Suo .................... | H04W 52/0206 |
| | | | | 370/328 |
| 9,357,499 | B2 * | 5/2016 | Yu .......................... | H04W 52/04 |
| 9,642,162 | B2 * | 5/2017 | Wei ....................... | H04L 5/0053 |
| 11,516,734 | B2 * | 11/2022 | Wang .................... | H04B 7/046 |
| 11,605,747 | B2 * | 3/2023 | Im .......................... | H10F 77/484 |
| 12,349,171 | B2 * | 7/2025 | Gong .................... | H04W 72/52 |
| 2013/0070635 | A1 | 3/2013 | Suo et al. | |
| 2015/0043413 | A1 | 2/2015 | Haim et al. | |
| 2015/0109971 | A1 | 4/2015 | Wei | |
| 2015/0334656 | A1 | 11/2015 | Ji et al. | |
| 2016/0192433 | A1 | 6/2016 | Deenoo et al. | |
| 2022/0408288 | A1 * | 12/2022 | Yu .......................... | H04L 5/0057 |
| 2023/0284133 | A1 * | 9/2023 | Luo .......................... | H04L 12/12 |
| | | | | 370/329 |
| 2023/0345359 | A1 * | 10/2023 | Yang ................. | H04W 52/0206 |

FOREIGN PATENT DOCUMENTS

| | | | |
|---|---|---|---|
| CN | 102113290 | A | 6/2011 |
| CN | 102123507 | A | 7/2011 |
| CN | 102340852 | A | 2/2012 |
| CN | 102340853 | A | 2/2012 |
| CN | 102340854 | A | 2/2012 |
| CN | 102833804 | A | 12/2012 |
| CN | 103404206 | A | 11/2013 |
| CN | 104618995 | A | 5/2015 |
| CN | 109565784 | A | 4/2019 |
| CN | 110099400 | A | 8/2019 |
| CN | 110831134 | A | 2/2020 |
| EP | 2665311 | A1 | 11/2013 |
| EP | 2408247 | B1 | 7/2019 |
| WO | 2013035974 | A1 | 3/2013 |
| WO | 2015103632 | A1 | 7/2015 |
| WO | 2017022723 | A1 | 2/2017 |
| WO | 2018063518 | A1 | 4/2018 |

OTHER PUBLICATIONS

Zhuang Zhan-hai et al:"Experiment and Analysis on Intelligent Shutdown Technology Based on LTE Network",Sep. 30, 2015,total 7 pages.

\* cited by examiner

Uplink and downlink transmission frame

| 0 | 1 | 3 | 4 | 5 | 6 | 7 | 8 | 9 |
|---|---|---|---|---|---|---|---|---|
| D | S | U | D | D | S | U | D | D |

RADIO FREQUENCY CHANNEL MANAGEMENT METHOD, APPARATUS, AND RELATED DEVICE

CROSS-REFERENCE TO RELATED APPLICATIONS

This application is a continuation of International Application PCT/CN2021/135228, filed on Dec. 3, 2021, which claims priority to Chinese Patent Application 202011538943.1, filed on Dec. 23, 2020. The disclosures of the aforementioned priority applications are hereby incorporated by reference in their entirety.

TECHNICAL FIELD

This application relates to the field of device energy-saving technologies, and in particular, to a radio frequency channel management method, an apparatus, and a related device.

BACKGROUND

As a capability of a next-generation communication system is enhanced, a quantity of radio frequency antennas is increasing, and a configuration in which a plurality of carriers share a radio frequency channel has become a mainstream. However, as a result, energy consumption of the radio frequency channel gradually increases. Therefore, energy consumption management of the radio frequency channel also becomes an important problem that affects operating costs.

Currently, when the energy consumption of the radio frequency channel is managed, some radio frequency channels are usually shut down based on load of a carrier, and a signal is sent through remaining radio frequency channels that are not shut down. For example, when load of a carrier A is low, ½ (or ¾) of radio frequency channels may be shut down, and a signal is sent through ½ (or ¼) of remaining radio frequency channels that are not shut down. However, in a scenario in which the plurality of carriers share the radio frequency, shutdown of the radio frequency channel is controlled for each carrier, and an energy-saving effect of the radio frequency channel may be poor.

SUMMARY

Embodiments of this application provide a radio frequency channel management method, apparatus, and device, a computer-readable storage medium, and a chip, to effectively save energy for a radio frequency channel.

According to a first aspect, an embodiment of this application provides a radio frequency channel management method. The method may be applied to a communication device. The communication device may include a plurality of carriers, and the plurality of carriers may share a same radio frequency channel of the communication device. The communication device includes a first carrier and a second carrier. When a radio frequency channel is managed, a downlink sub-frame of the communication device may be obtained, and a target sub-frame in the downlink sub-frames may be determined, where in a time period corresponding to the determined target sub-frame, both the first carrier and the second carrier allow shutting down a target radio frequency channel of the communication device. Target radio frequency channels may be all or some radio frequency channels of the communication device. Then, the target radio frequency channel may be shut down in the time period corresponding to the target sub-frame. In this way, an energy-saving effect of the radio frequency channel can be achieved by performing shutdown control on the radio frequency channel in a time period corresponding to a sub-frame granularity without affecting data communication between the communication device and another device based on each carrier.

In a possible implementation, the communication device may further pre-determine the target radio frequency channel to be shut down. During specific implementation, the communication device may obtain a first radio frequency channel that can be shut down and that corresponds to the first carrier, and may determine some or all radio frequency channels in the first radio frequency channel as target radio frequency channels. In this way, the communication device may shut down fixed radio frequency channels for a plurality of different carriers, to avoid a case that the communication device cannot shut down any radio frequency channel because the communication device shuts down a radio frequency channel A for the first carrier and shuts down a radio frequency channel B for the second carrier.

In a possible implementation, when determining the target sub-frame in the downlink sub-frame, the communication device may specifically determine the target sub-frame based on traffic load corresponding to the first carrier and traffic load corresponding to the second carrier. For example, when the traffic load of the first carrier and the traffic load of the second carrier are heavy, the communication device may determine that there is a large quantity of target sub-frames; and when the traffic load of the first carrier and the traffic load of the second carrier are light, the communication device may determine that there is a small quantity of target sub-frames. In this way, the quantity of target sub-frames can be flexibly configured.

In a possible implementation, when shutting down the target radio frequency channel of the communication device in the time period corresponding to the target sub-frame, the communication device may specifically set a weight of transmit power of the target radio frequency channel to zero in the time period corresponding to the target sub-frame. Certainly, the weight of the transmit function of the target radio frequency channel may alternatively be reduced to another non-zero value. In this way, power consumption of the target radio frequency channel can be reduced or even no power consumption is generated, thereby achieving an objective of saving energy of the radio frequency channel.

In a possible implementation, the first carrier and the second carrier are carriers of a same type. For example, both the first carrier and the second carrier may be LTE technology-based carriers, or may be NR technology-based carriers. Alternatively, the first carrier and the second carrier are carriers of different types. For example, the first carrier is an LTE technology-based carrier, and the second carrier is an NR technology-based carrier.

In a possible implementation, when traffic corresponding to a data signal carried by the second carrier in a preset time period is large-packet traffic, the communication device may further skip shutting down the target radio frequency channel in the time period corresponding to the target sub-frame. In this way, shutdown of the target radio frequency channel can be prevented from affecting efficiency of data communication between the communication device and another device, so that the efficiency of data communication between the communication device and the another device reaches a high level.

In a possible implementation, the communication device communicates with user equipment based on the second carrier. When a communication distance between the communication device and the user equipment exceeds a preset distance, if the communication device shuts down the target radio frequency channel and communicates with the user equipment through remaining radio frequency channels, and because a quantity of radio frequency channels for sending a carrier signal is reduced, a signal gain is reduced. In this case, the communication device may skip shutting down the target radio frequency channel in the time period corresponding to the target sub-frame, to avoid a case that the carrier signal sent by the communication device to the user equipment cannot be completely received or successfully parsed by the user equipment, which severely reduces quality of communication between the communication device and the user equipment, or even causes a failure of normal communication.

According to a second aspect, an embodiment of this application further provides a radio frequency channel management apparatus. The apparatus is used in a communication device. The communication device includes a first carrier and a second carrier. The apparatus includes: a first obtaining unit, configured to obtain a downlink sub-frame of the communication device; a first determining unit, configured to determine a target sub-frame in the downlink sub-frame, where both the first carrier and the second carrier allow shutting down a target radio frequency channel of the communication device in a time period corresponding to the target sub-frame; and a shutdown unit, configured to shut down the target radio frequency channel in the time period corresponding to the target sub-frame.

In a possible implementation, the apparatus further includes: a second obtaining unit, configured to obtain a first radio frequency channel that can be shut down and that corresponds to the first carrier; and a second determining unit, configured to determine the target radio frequency channel in the first radio frequency channel.

In a possible implementation, the first determining unit is specifically configured to determine the target sub-frame based on traffic load corresponding to the first carrier and traffic load corresponding to the second carrier.

In a possible implementation, the shutdown unit is specifically configured to set a weight of transmit power of the target radio frequency channel to zero in the time period corresponding to the target sub-frame.

In a possible implementation, the first carrier and the second carrier are carriers of a same type; or the first carrier and the second carrier are carriers of different types.

In a possible implementation, the apparatus further includes: a first non-shutdown unit, configured to skip shutting down the target radio frequency channel in the time period corresponding to the target sub-frame when traffic corresponding to a data signal carried by the second carrier in a preset time period is large-packet traffic.

In a possible implementation, the communication device communicates with user equipment based on the second carrier, and the apparatus further includes: a second non-shutdown unit, configured to skip shutting down the target radio frequency channel in the time period corresponding to the target sub-frame when a communication distance between the communication device and the user equipment exceeds a preset distance.

The radio frequency channel management apparatus described in the second aspect corresponds to the radio frequency channel management method described in the first aspect. Therefore, various possible implementations and beneficial effects of the second aspect may refer to the related descriptions of the corresponding implementations and the beneficial effects in the first aspect. Details are not described herein again.

According to a third aspect, an embodiment of this application further provides a radio frequency channel management device, including a processor and a memory, where the memory is configured to store instructions or a computer program, and the processor is configured to execute the instructions or the computer program, to enable the method according to any implementation of the first aspect to be performed.

The radio frequency channel management device described in the third aspect corresponds to the radio frequency channel management method described in the first aspect. Therefore, various possible implementations and beneficial effects of the third aspect may refer to the related descriptions of the corresponding implementations and the beneficial effects in the first aspect. Details are not described herein again.

According to a fourth aspect, an embodiment of this application further provides a computer-readable storage medium, including instructions or a computer program. When the instructions or the computer program is run on a computer, the computer is enabled to perform the method according to any implementation of the first aspect. Various possible implementations and beneficial effects of the fourth aspect may refer to the related descriptions of the corresponding implementations and the beneficial effects in the first aspect. Details are not described herein again.

The computer-readable storage medium described in the fifth aspect corresponds to the radio frequency channel management method described in the first aspect. Therefore, various possible implementations and beneficial effects of the fifth aspect may refer to the related descriptions of the corresponding implementations and the beneficial effects in the first aspect. Details are not described herein again.

According to a sixth aspect, an embodiment of this application provides a chip. The chip includes a processor and a communication interface. The communication interface is coupled to the processor. The processor is configured to run a computer program or instructions, to implement the radio frequency channel management method described in the possible implementations of the first aspect. The communication interface is configured to communicate with a module other than the chip. Various possible implementations and beneficial effects of the sixth aspect may refer to the related descriptions of the corresponding implementations and the beneficial effects in the first aspect. Details are not described herein again.

BRIEF DESCRIPTION OF DRAWINGS

To describe technical solutions of embodiments of this application more clearly, the following briefly describes accompanying drawings for describing embodiments. It is clear that the accompanying drawings in the following descriptions show merely some embodiments of this application, and a person of ordinary skill in the art may derive other drawings from these accompanying drawings.

DESCRIPTION OF EMBODIMENTS

Figure 1:
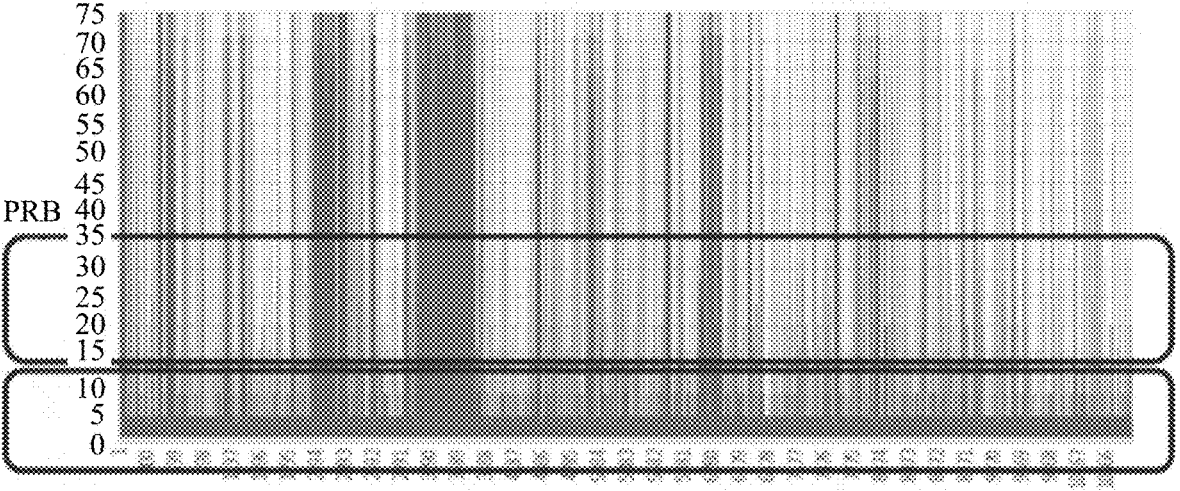
FIG. 1 is a schematic diagram of an example of physical resource block scheduling according to an embodiment of this application.

In an actual application, when performing data communication with another device, a communication device may send a carrier signal to the another device through a radio frequency channel. The carrier signal may carry communication data (specifically, a data signal that carries the communication data) between the communication device and the another device. However, FIG. 1 is a schematic diagram of distribution of a physical resource block (physical resource block, PRB) scheduled within a transmission time interval (transmission time interval, TTI) when a communication device communicates with another device based on a bandwidth of 15M (megabytes). Utilization of a large quantity of PRBs is less than 10%. In other words, traffic load of a carrier on the communication device is in a low load state in a large quantity of time period. Therefore, energy-saving of a radio frequency channel of the communication device becomes an important problem in energy consumption management of the communication device.

Currently, in a process of performing energy consumption management on the radio frequency channel of the communication device, when traffic load corresponding to a carrier (that is, communication data that needs to be sent on the carrier) is low, some radio frequency channels of the communication device are shut down, and a carrier signal carrying a data signal is sent to another device through remaining radio frequency channels.

However, in a scenario in which a plurality of carriers share a radio frequency channel, a same radio frequency channel of the communication device (for example, a base station or a transmitting point) may support signal transmission on a plurality of different carriers. In this case, an expected energy-saving effect cannot be achieved when shutdown control is performed on the radio frequency channel for each carrier. For example, it is assumed that the same radio frequency channel of the communication device may support signal transmission on a carrier A and a carrier B. Although both traffic load corresponding to the carrier A and traffic load corresponding to the carrier B may be low, when the carrier A does not occupy the radio frequency channel for signal transmission, the carrier B may need to occupy the radio frequency channel for signal transmission, and when the carrier B does not occupy the radio frequency channel for signal transmission, the carrier A may still need to occupy the radio frequency channel for signal transmission. Therefore, the radio frequency channel may never be shut down. Therefore, it is usually difficult for the communication device to achieve an ideal energy-saving effect by performing shutdown control on the radio frequency channel based on each carrier.

In view of this, an embodiment of this application provides a radio frequency channel management method, to effectively save energy for the radio frequency channel in the scenario in which the plurality of carriers share the radio frequency channel. During specific implementation, a downlink sub-frame of the communication device may be obtained. The downlink sub-frame refers to that data may be transmitted to another device through downlink on a first carrier and/or a second carrier in a time period corresponding to the downlink sub-frame. Then, the communication device may determine a target sub-frame in the downlink sub-frame. Both the first carrier and the second carrier allow shutting down the radio frequency channel in a time period corresponding to the target sub-frame. Therefore, the communication device may shut down the target radio frequency channel of the communication device in the time period corresponding to the target sub-frame, to save energy for the target radio frequency channel. In this way, an energy-saving effect of the communication device (that is, energy-saving of the radio frequency channel) can be achieved by performing shutdown control on the radio frequency channel in a time period corresponding to a sub-frame granularity without affecting data communication between the communication device and the another device based on each carrier.

Figure 2:
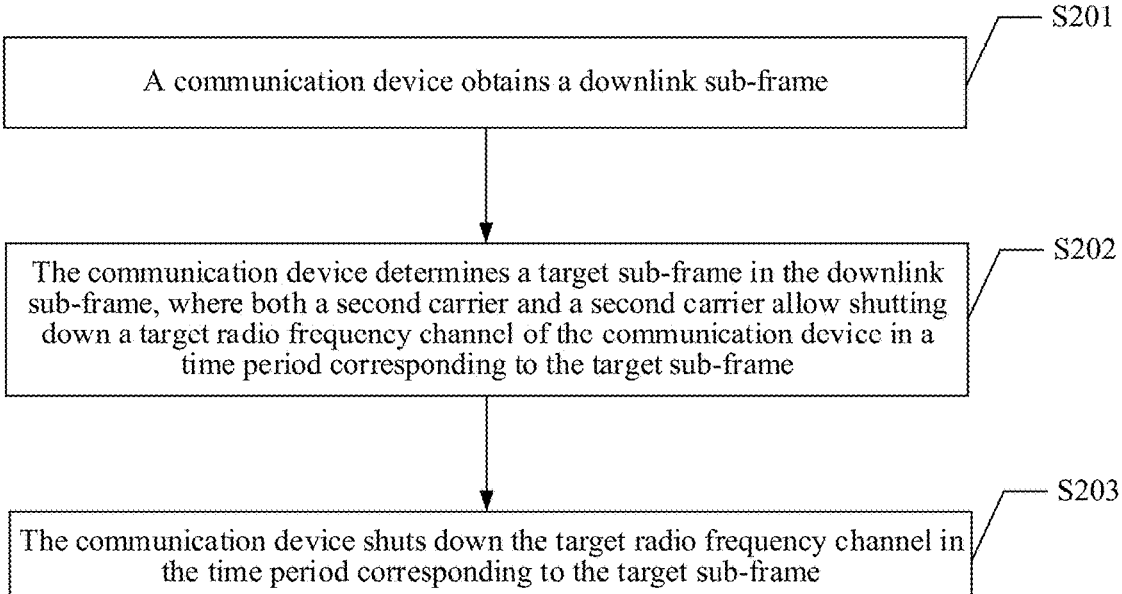
FIG. 2 is a schematic flowchart of a radio frequency channel management method according to an embodiment of this application.

The following describes various non-limiting implementations in embodiments of this application through examples with reference to the accompanying drawings. FIG. 2 is a schematic flowchart of a radio frequency channel management method according to an embodiment of this application. The method may be applied to the communication device that performs data communication with the another device through a radio frequency channel. For example, the communication device may be a device such as a base station or a signal transmitting point, and the another device that performs data communication with the communication device may be, for example, a terminal device. The communication device may include a plurality of carriers. For ease of description, in this embodiment, an example in which the communication device includes a first carrier and a second carrier is used. The first carrier and the second carrier may share a same radio frequency channel of the communication device. The method may specifically include the following steps.

S201: The communication device obtains a downlink sub-frame.

In this embodiment, when the communication device performs data communication with the another device, an uplink and downlink transmission frame may be divided into a plurality of sub-frames. The communication device may execute a corresponding uplink or downlink communication process in time periods corresponding to different sub-frames. For example, duration of an uplink and downlink transmission frame shown in FIG. 3 may be 10 ms (milliseconds). The uplink and downlink transmission frame may be divided into 10 sub-frames, which are respectively numbered 0 to 9. Duration of each sub-frame is 1 ms. D in sub-frames 0, 3, 4, 5, 8, and 9 (which are referred to as downlink sub-frames below) represents downlink data transmission of the communication device. U in sub-frames 2 and 7 represents uplink data transmission of the communication device. S in sub-frames 1 and 6 represents a special sub-frame. In a time period corresponding to the special sub-frame, the communication device may send and receive uplink and downlink communication data by time period or send and receive no communication data.

When traffic load corresponding to the first carrier is low, the communication device may shut down some radio frequency channels of the communication device for the first carrier in time periods corresponding to all or some downlink sub-frames of the communication device, thereby achieving an objective of saving energy of the radio frequency channel. Similarly, when traffic load corresponding to the second carrier is low, the communication device may also shut down some radio frequency channels of the communication device for the second carrier in the time periods corresponding to all or some downlink sub-frames. Because the first carrier and the second carrier are generally used for data communication of different traffic, the traffic load of the first carrier may be different from the traffic load of the second carrier. Therefore, if the communication device separately controls shutdown of the radio frequency channel for the first carrier and the second carrier, an energy-saving effect of the radio frequency channel may be unsatisfactory. For example, when both the traffic load corresponding to the first carrier and the traffic load corresponding to the second carrier are 60%, the communication device determines that a specific radio frequency channel can be shut down in the downlink sub-frames 3, 4, and 9 for the first carrier, and a specific radio frequency channel can be shut down in the downlink sub-frames 3, 4, and 8 for the second carrier. In this case, to enable the communication device to normally communicate with the another device through the first carrier and the second carrier, in a time period corresponding to the frame 8, the communication device may fail to normally shut down the radio frequency channel (because the second carrier needs to transmit a carrier signal in the time period through the radio frequency channel), and in a time period corresponding to the frame 9, the communication device may fail to normally shut down the radio frequency channel (because the first carrier needs to transmit a carrier signal in the time period through the radio frequency channel). Therefore, the communication device can shut down the radio frequency channel only in the downlink sub-frames 3 and 4. However, when the communication device determines that a specific radio frequency channel is shut down in the downlink sub-frames 0, 5, and 8 for the second carrier, the communication device cannot shut down the radio frequency channel in a time period corresponding to any downlink sub-frame, causing the communication device to fail to achieve energy-saving of the radio frequency channel.

Therefore, in this embodiment, the following steps may be further performed.

S202: The communication device determines a target sub-frame in the downlink sub-frame, where both the second carrier and the second carrier allow shutting down a target radio frequency channel of the communication device in a time period corresponding to the target sub-frame.

In this embodiment, the communication device may intermittently shut down some radio frequency channels of the communication device, to achieve an objective of saving energy of the radio frequency channels. During specific implementation, the communication device may shut down the target radio frequency channel of the communication device in time periods corresponding to some or all sub-frames of the downlink sub-frames.

The target radio frequency channel to be shut down may be preset by the communication device.

Figures 3, 4:
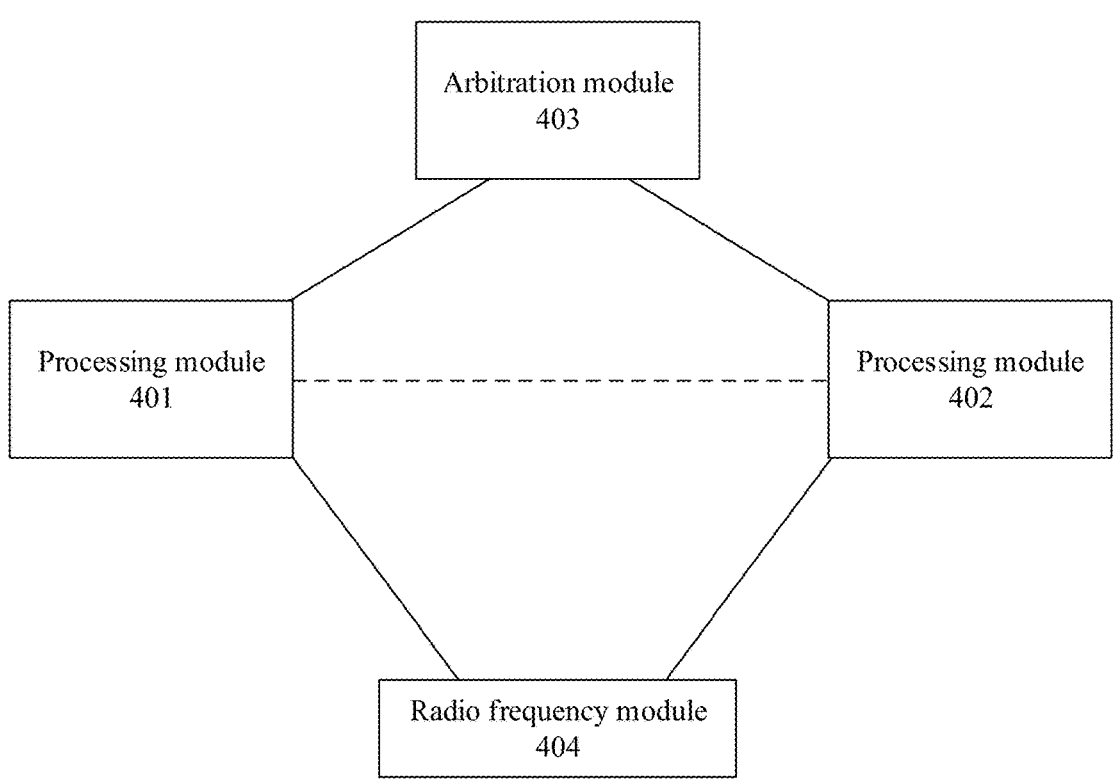
FIG. 3 is a schematic diagram of an example of an uplink and downlink transmission frame according to an embodiment of this application.
FIG. 4 is a schematic diagram of an example of modules on a communication device according to an embodiment of this application.

In a possible implementation, as shown in FIG. 4, the communication device may include a processing module 401, a processing module 402, and an arbitration module 403. The processing module 401 may determine, for the first carrier, a first radio frequency channel that can be shut down. The processing module 402 may determine, for the first carrier, a second radio frequency channel that can be shut down. Because the first radio frequency channel may be different from the second radio frequency channel, an energy-saving effect of the radio frequency channel may be affected. Therefore, in this embodiment, the processing module 401 may send first radio frequency channel information corresponding to the first carrier to the arbitration module 403. In addition, the processing module 402 may also send second radio frequency channel information corresponding to the second carrier to the arbitration module 403. In this way, the arbitration module 403 may perform arbitration based on the first radio frequency channel and the second radio frequency channel, to determine the target radio frequency channel to be shut down. For example, when the communication device has 64 radio frequency channels (which are respectively numbered 1 to 64), the first radio frequency channel may include the first 48 radio frequency channels, that is, numbered 1 to 48, and the second radio frequency channel may include the last 48 radio frequency channels, that is, numbered 17 to 64. In this case, the arbitration module 403 may determine that target radio frequency channels to be shut down are the radio frequency channels numbered 17 to 48. Then, the arbitration module 403 separately notifies the processing module 401 and the processing module 402 of information about the determined target radio frequency channels. Correspondingly, when subsequently sending a carrier signal through a radio frequency module 404, the processing module 401 and the processing module 402 may schedule the radio frequency module 404 to send the carrier signal on the radio frequency channel that is not shut down. Certainly, in an actual application, the arbitration module may also determine, in another manner, the target radio frequency channel to be shut down. This is not limited in this embodiment.

In the foregoing implementation, the target radio frequency channel is determined through the third-party arbitration module 403. In another possible implementation, the target radio frequency channel may alternatively be determined through negotiation between two processing modules.

Figure 5:
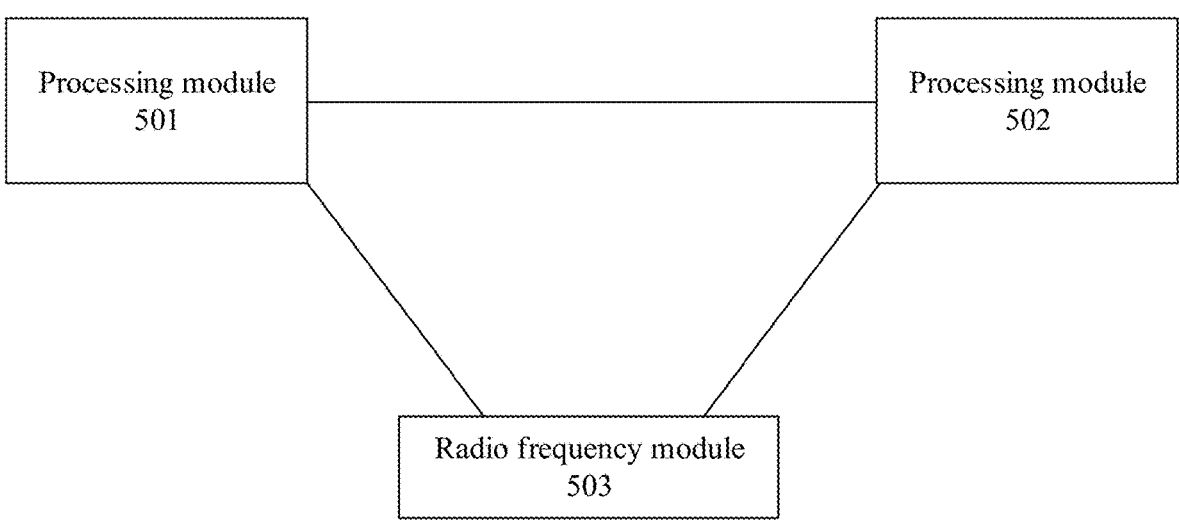
FIG. 5 is a schematic diagram of still another example of modules on a communication device according to an embodiment of this application.

Specifically, as shown in FIG. 5, a processing module 501 may determine, for the first carrier, a first radio frequency channel that can be shut down, and send first radio frequency channel information to a processing module 502. The processing module 502 may also determine, for the second carrier, a second radio frequency channel that can be shut down, determine a target radio frequency channel based on the second radio frequency channel and the received first radio frequency channel, and notify the processing module 501 of information about the target radio frequency channel. Correspondingly, when subsequently sending a carrier signal through a radio frequency module 503, the processing module 501 and the processing module 502 may schedule the radio frequency module 503 to send the carrier signal on the radio frequency channel that is not shut down. For a specific implementation of determining, by the processing module 502, the target radio frequency channel based on the first radio frequency channel information and the second radio frequency channel information, refer to the related description of determining, by the arbitration module 403, the target radio frequency channel in the foregoing implementation. Details are not described herein again.

After information arbitration of the third-party arbitration module 403 on the communication device or negotiation between the processing modules corresponding to the two carriers is performed, it may be determined that specific radio frequency channels of the communication device are shut down each time. In this way, a case that radio frequency channels cannot be shut down because there is no intersection set between the radio frequency channels determined by the communication device for different carriers can be avoided. In an actual application, the communication device may periodically (for example, every 10 seconds) perform the process of determining the target radio frequency channel. Alternatively, after determining the target radio frequency channel, the communication device subsequently shuts down the target radio frequency channel to save energy. Alternatively, in another possible implementation, the target radio frequency channel may be preset by a skilled person.

The communication device may determine, for example, based on traffic load corresponding to each carrier, the target sub-frame in which the target radio frequency channel is to be shut down. Specifically, the communication device may predetermine, for each carrier, a correspondence between traffic load corresponding to the carrier and a number of a downlink sub-frame in which shutdown is performed. In this way, the communication device may determine, for the first carrier based on current traffic load or traffic load that is predicted in a future time period of the first carrier, a first downlink sub-frame in which the target radio frequency channel is to be shut down. For example, for the uplink and downlink transmission frame shown in FIG. 3, when the traffic load corresponding to the first carrier is less than 30%, the communication device may determine that the first carrier allows shutting down the target radio frequency channel in the downlink sub-frames 3, 4, 8, and 9, that is, first downlink sub-frames are the sub-frames 3, 4, 8, and 9. However, when the traffic load corresponding to the first carrier is less than 50%, the communication device may determine that the first carrier allows shutting down the target radio frequency channel in the downlink sub-frames 3, 4, and 9, that is, the first downlink sub-frames are the sub-frames 3, 4, 9, and the like. Certainly, when the traffic load corresponding to the first carrier is greater than 50%, the target radio frequency channel is not shut down. The correspondence between the traffic load corresponding to the first carrier and the number of the downlink sub-frame in which the radio frequency channel is to be shut down may be set by a skilled person or certainly may be determined in another manner.

Similarly, the communication device may further determine, for the second carrier based on current traffic load or traffic load that is predicted in a future time period of the second carrier, a second downlink sub-frame in which the target radio frequency channel is to be shut down, so that the target sub-frame in which the target radio frequency channel is to be shut down may be further determined based on the first downlink sub-frame and the second downlink sub-frame.

For example, a specific implementation process of determining the target sub-frame by the communication device may be implemented by the arbitration module 403 shown in FIG. 4. Specifically, after determining the first downlink sub-frame based on the traffic load corresponding to the first carrier, the processing module 401 may send the first downlink sub-frame to the arbitration module 403. In addition, the processing module 402 may also send the second downlink sub-frame determined based on the traffic load corresponding to the second carrier to the arbitration module 403. In this way, the arbitration module 403 may determine a same sub-frame in the first downlink sub-frame and the second downlink sub-frame, and notifies the processing module 401 and the processing module 402 of the same sub-frame as the target sub-frame. In an actual application, the processing module 401 and the processing module 402 may determine, according to a same rule, a downlink sub-frame in which the target radio frequency channel is to be shut down. In this way, the first downlink sub-frame and the second downlink sub-frame may be the same. For example, both the first downlink sub-frame and the second downlink sub-frame are the downlink sub-frames 3, 4, 8, and 9. Alternatively, when the first downlink sub-frame and the second downlink sub-frame include different quantities of sub-frames, the first downlink sub-frame is a subset of the second downlink sub-frame, or the second downlink sub-frame is a subset of the first downlink sub-frame. Alternatively, the arbitration module 403 may determine a smaller value of quantities of sub-frames that are respectively included in the first downlink sub-frame and the second downlink sub-frame, and select any downlink sub-frame of the quantity (the smaller value) from the uplink and downlink transmission frames as the target sub-frame.

For another example, a specific implementation process of determining the target sub-frame by the communication device may be determined by the processing module 501 and the processing module 502 shown in FIG. 5 through negotiation. Specifically, after determining the first downlink sub-frame based on the traffic load corresponding to the first carrier, the processing module 501 may send the first downlink sub-frame to the processing module 502. The processing module 502 determines, based on the traffic load corresponding to the second carrier, whether to use the first downlink sub-frame as the target sub-frame. It is assumed that the load of the first carrier is less than 30%, the first downlink sub-frame determined by the processing module 501 includes the downlink sub-frames 3, 4, 8, and 9. In this case, if the load of the second carrier is also less than 30%, the processing module 502 may use the received first downlink sub-frame as the target sub-frame, and if the load of the second carrier is greater than 30% but less than 50%, the processing module 502 determines that the target radio frequency channel is allowed to be shut down only in time periods corresponding to three downlink sub-frames. In this case, the processing module 502 may select some sub-frames from the first downlink sub-frame and determine the sub-frames as the target sub-frames, for example, determine the downlink sub-frames 3, 4, and 9 in the first downlink sub-frame as the target sub-frames. Then, the processing module 502 may feed back the determined target sub-frame to the processing module 501, or when determining to use the first downlink sub-frame as the target sub-frame, the processing module 502 may feed back confirmation information to the processing module 501. In this way, target sub-frame negotiation between the processing module 501 and the processing module 502 can be implemented. Certainly, in the architecture of the communication device shown in FIG. 4, the processing module 401 and the processing module 402 may alternatively negotiate the target sub-frame.

After determining the target radio frequency channel and the target sub-frame in which the target radio frequency channel is to be shut down, the communication device may continue to perform the following steps, to achieve energy-saving of the communication device (that is, the radio frequency channel).

S203: The communication device shuts down the target radio frequency channel in the time period corresponding to the target sub-frame.

In an example implementation, when shutting down the target radio frequency channel, the communication device may specifically set a weight of transmit power of the target radio frequency channel to zero. In this way, in the time period corresponding to the target sub-frame, the target radio frequency channel may not generate power consumption because the transmit power is zero, thereby achieving an expected energy-saving effect. Certainly, the weight of the transmit power of the target radio frequency channel may alternatively be reduced to a preset non-zero value. This is not limited in this embodiment.

It should be noted that, in this embodiment, the communication device shuts down the target radio frequency channel at a sub-frame granularity (a millisecond level), instead of shutting down some radio frequency channels of the communication device for a long time (for example, a minute level or an hour level). Therefore, a pilot signal/a common signal of the communication device may be sent through all radio frequency channels in a time period corresponding to a non-target sub-frame. In this way, a signal gain of the pilot signal/the common signal may not be reduced, and signal coverage of the communication device can be prevented from being reduced.

In an actual application, the communication device may further determine, with reference to another factor, whether to shut down the target radio frequency channel.

For example, in an example, the communication device may further determine whether traffic corresponding to data signals carried by the first carrier and the second carrier in a preset time period (for example, within a recent 1 second) is small-packet traffic or large-packet traffic. When it is determined that both the traffic is the small-packet traffic, and when the communication device communicates with another device, a low transmission rate of communication data is required. In this case, the communication device can achieve the objective of energy-saving by shutting down the target radio frequency channel. However, when it is determined that the current traffic on the first carrier or the second carrier is the large-packet traffic, and when the communication device communicates with the another device, a high transmission rate of the communication data is required. To avoid affecting efficiency of data communication between the communication device and the another device by shutting down the target radio frequency channel, the communication device may not shut down the target radio frequency channel in the time period corresponding to the target sub-frame, so that the efficiency of data communication between the communication device and the another device is high.

In some actual application scenarios, when the traffic corresponding to the second carrier is the small-packet traffic, the communication device may also directly shut down the target radio frequency channel based on the second downlink sub-frame that is allowed by the second carrier and in which the target radio frequency channel is to be shut down, and may not consider the first downlink sub-frame and that is allowed by the first carrier and in which the target radio frequency channel is to be shut down. In this case, when a quantity of sub-frames included in the second downlink sub-frame is greater than a quantity of sub-frames included in the first downlink sub-frame, the energy-saving effect can be further achieved.

In another example, the communication device may determine, based on a communication distance between the communication device and user equipment, whether to shut down the target radio frequency channel. For example, when the communication distance between the communication device and the user equipment is short, even if the communication device shuts down the target radio frequency channel and communicates with the user equipment through remaining radio frequency channels, quality of communication between the communication device and the user equipment can still maintain at a high level. In this case, the communication device may shut down the target radio frequency channel in the time period corresponding to the target sub-frame. However, when the communication distance between the communication device and the user equipment is long, if the communication device shuts down the target radio frequency channel and communicates with the user equipment through the remaining radio frequency channels, and because a quantity of radio frequency channels for sending a carrier signal is reduced, a signal gain is reduced. In this case, the carrier signal sent by the communication device to the user equipment cannot be fully received or successfully parsed by the user equipment, which severely reduces the quality of communication between the communication device and the user equipment, or even causes a failure of normal communication. Therefore, when the communication distance between the communication device and the user equipment exceeds a preset distance, the communication device may also not shut down the target radio frequency channel in the time period corresponding to the target sub-frame.

Certainly, in an actual application, energy-saving may also be preferentially considered for the communication device. In this way, even if the communication distance between the communication device and the user equipment is long, the communication device may also shut down the target radio frequency channel in the time period corresponding to the target sub-frame. In an actual application, whether to shut down the target radio frequency channel may be determined with reference to an actual application requirement. This is not limited in this embodiment.

In this embodiment, the first carrier and the second carrier may be different carriers of a same type. For example, the first carrier and the second carrier both may be long term evolution (Long Term Evolution, LTE) technology-based carriers, or may be new radio (New Radio, NR) technology-based carriers. In this case, frequencies of the first carrier and the second carrier are different. Alternatively, the first carrier and the second carrier may be different types of carriers.

For example, the first carrier is an LTE technology-based carrier, and the second carrier is an NR technology-based carrier.

Figure 6:
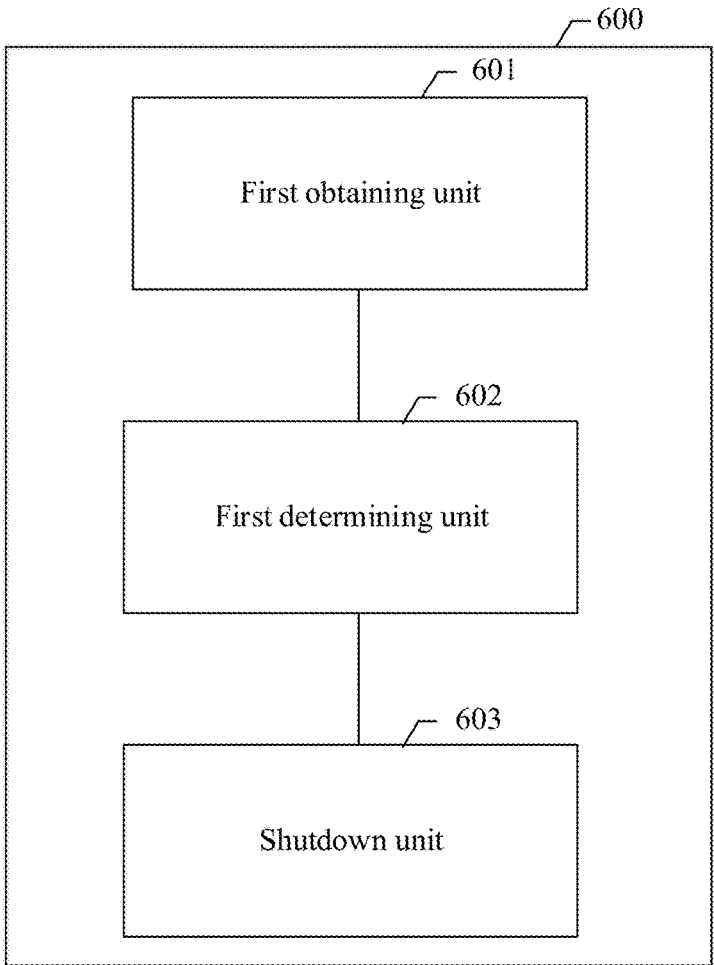
FIG. 6 is a schematic diagram of a structure of a radio frequency channel management apparatus according to an embodiment of this application.

In addition, an embodiment of this application further provides a radio frequency channel management apparatus. FIG. 6 is a schematic diagram of a structure of a radio frequency channel management apparatus according to an embodiment of this application. The apparatus 600 may be used in the foregoing communication device. The communication device includes at least a first carrier and a second carrier, and may perform the method steps performed by the communication device in the foregoing method embodiments. Specifically, the apparatus 600 may include:

a first obtaining unit 601, configured to obtain a downlink sub-frame of the communication device;

a first determining unit 602, configured to determine a target sub-frame in the downlink sub-frame, where both the first carrier and the second carrier allow shutting down a target radio frequency channel of the communication device in a time period corresponding to the target sub-frame; and a shutdown unit 603, configured to shut down the target radio frequency channel in the time period corresponding to the target sub-frame.

In a possible implementation, the apparatus 600 further includes:

a second obtaining unit, configured to obtain a first radio frequency channel that can be shut down and that corresponds to the first carrier; and a second determining unit, configured to determine the target radio frequency channel in the first radio frequency channel.

In a possible implementation, the first determining unit 601 is specifically configured to determine the target sub-frame based on traffic load corresponding to the first carrier and traffic load corresponding to the second carrier.

In a possible implementation, the shutdown unit 603 is specifically configured to set a weight of transmit power of the target radio frequency channel to zero in the time period corresponding to the target sub-frame.

In a possible implementation, the first carrier and the second carrier are carriers of a same type; or the first carrier and the second carrier are carriers of different types.

In a possible implementation, the apparatus 600 further includes:

a first non-shutdown unit, configured to skip shutting down the target radio frequency channel in the time period corresponding to the target sub-frame when traffic corresponding to a data signal carried by the second carrier in a preset time period is large-packet traffic.

In a possible implementation, the communication device communicates with user equipment based on the second carrier, and the apparatus 600 further includes:

a second non-shutdown unit, configured to skip shutting down the target radio frequency channel in the time period corresponding to the target sub-frame when a communication distance between the communication device and the user equipment exceeds a preset distance.

Because content such as information exchange and an execution process between units of the foregoing apparatus is based on a same concept as the method embodiments in embodiments of this application, technical effects brought by the apparatus are the same as those brought by the method embodiments in embodiments of this application. For ease and brevity of description, a specific working process of the foregoing apparatus and units may refer to the corresponding process in the foregoing method embodiments. Details are not described herein again.

In the apparatus shown in FIG. 6, the first obtaining unit 601, the first determining unit 602, the shutdown unit 603, and the like may be units that are physically separated from each other, or may be integrated into one or more physical units. This is not limited herein.

In addition, an embodiment of this application further provides a radio frequency channel management device. The radio frequency channel management device may be used in the communication device mentioned in the foregoing method embodiments. The radio frequency channel management device may include a processor and a memory, where the processor is coupled to the memory;

the memory is configured to store a computer program or instructions; and the processor is configured to execute the computer program or the instructions, to enable the radio frequency channel management method performed by the communication device in the foregoing method embodiments to be performed.

Figure 7:
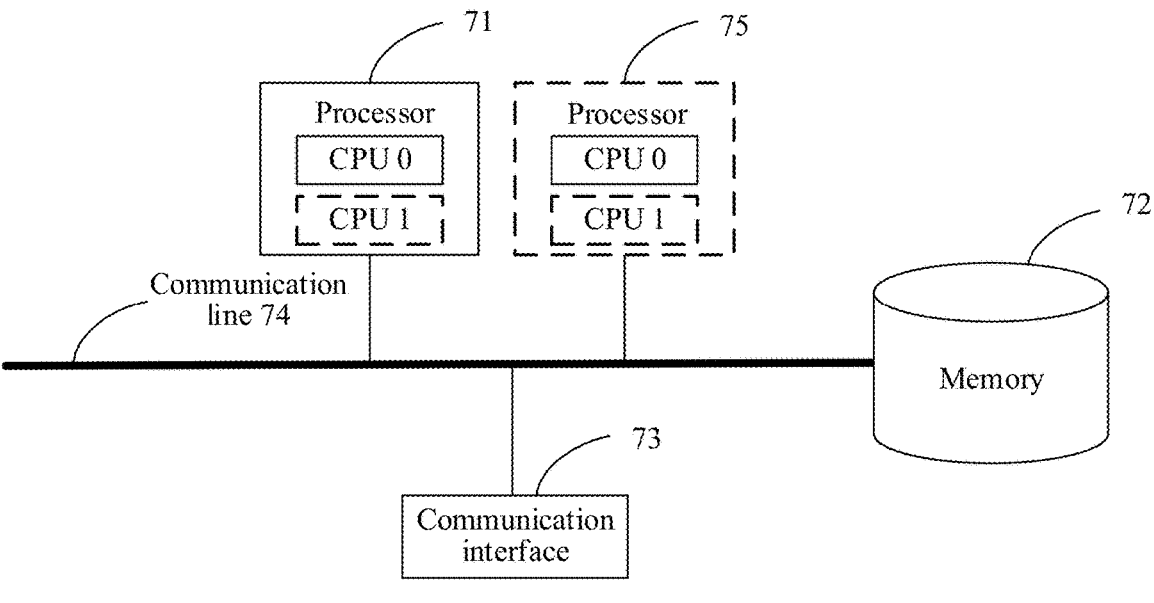
FIG. 7 is a schematic diagram of a hardware structure of a radio frequency channel management device according to an embodiment of this application.

FIG. 7 is a schematic diagram of a hardware structure of a radio frequency channel management device. The radio frequency channel management device may be a communication device in embodiments of this application. The radio frequency channel management device includes at least one processor 71 (which may further include a processor 75 and the like shown in FIG. 7), at least one memory 72, and at least one communication interface 73. The processor 71, the memory 72 and the communication interface 73 connect to each other, for example, through a communication line 74. In embodiments of this application, the processor 71 may include one CPU. For example, the processor 71 shown in FIG. 7 may include only a CPU 0. Alternatively, the processor 71 may include a plurality of CPUs. For example, the processor 71 shown in FIG. 7 may further include a CPU 0, a CPU 1, and the like. Certainly, the processor 71 may further include at least three (including three) CPUs. Optionally, the communication apparatus further includes another processor. As shown in FIG. 7, the communication apparatus may further include a processor 75, and the another processor may also include one or more CPUs. Connections may include various types of interfaces, transmission lines, buses, or the like. This is not limited in this embodiment. The communication interface 73 is configured to enable the communication apparatus to be connected to another device through a communication link.

The processor 71 shown in FIG. 7 may specifically complete the action processed by the communication device in the foregoing method. The memory 72 may complete the action stored in the foregoing method. The communication interface 73 may complete the action of interaction between the communication device and the another device in the foregoing method.

The processor in embodiments of this application, for example, the processor 71, may include but is not limited to at least one of the following: a central processing unit (central processing unit, CPU), a microprocessor, a digital signal processor (DSP), a microcontroller unit (microcontroller unit, MCU), an artificial intelligence processor, or various computing devices that run software. Each computing device may include one or more cores configured to execute software instructions to perform an operation or processing. The processor may be an independent semiconductor chip, or may be integrated with another circuit into a semiconductor chip. For example, the processor may form an SoC (system-on-a-chip) with another circuit (for example, a codec circuit, a hardware acceleration circuit, or various buses and interface circuits). Alternatively, the processor may be integrated into an ASIC as a built-in processor of the ASIC, and the ASIC integrated with the processor may be separately packaged, or may be packaged with another circuit. In addition to the core configured to execute software instructions to perform an operation or processing, the processor may further include a necessary hardware accelerator, for example, a field programmable gate array (field programmable gate array, FPGA), a PLD (programmable logic device), or a logic circuit that implements a dedicated logic operation.

The memory in embodiments of this application may include at least one of the following types: a read-only memory (read-only memory, ROM) or another type of static storage device that can store static information and instructions, a random access memory (random access memory, RAM) or another type of dynamic storage device that can store information and instructions, or an electrically erasable programmable read-only memory (Electrically erasable programmable read-only memory, EEPROM). In some scenarios, the memory may alternatively be a compact disc read-only memory (compact disc read-only memory, CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, the memory is not limited thereto.

The memory 72 may exist independently, and is connected to the processor 71 (and the processor 75). Optionally, the memory 72 may be integrated with the processor 71 (and the processor 75), for example, integrated into a chip. The memory 72 can store program code for executing the technical solutions in embodiments of this application, and the processor 71 controls execution of the program code. Various types of executed computer program code may also be considered as drivers of the processor 71. For example, the processor 71 is configured to execute computer program code stored in the memory 72, to implement the technical solutions in embodiments of this application.

In the foregoing embodiments, the instructions that are stored in the memory and that are to be executed by the processor may be implemented in a form of a computer program product. The computer program product may be written into the memory in advance, or may be downloaded and installed in the memory in a form of software.

The computer program product includes one or more computer instructions. When the computer program instructions are loaded and executed on a computer, all or some of procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be stored in a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state drive solid state drive, SSD), or the like.

Figure 8:
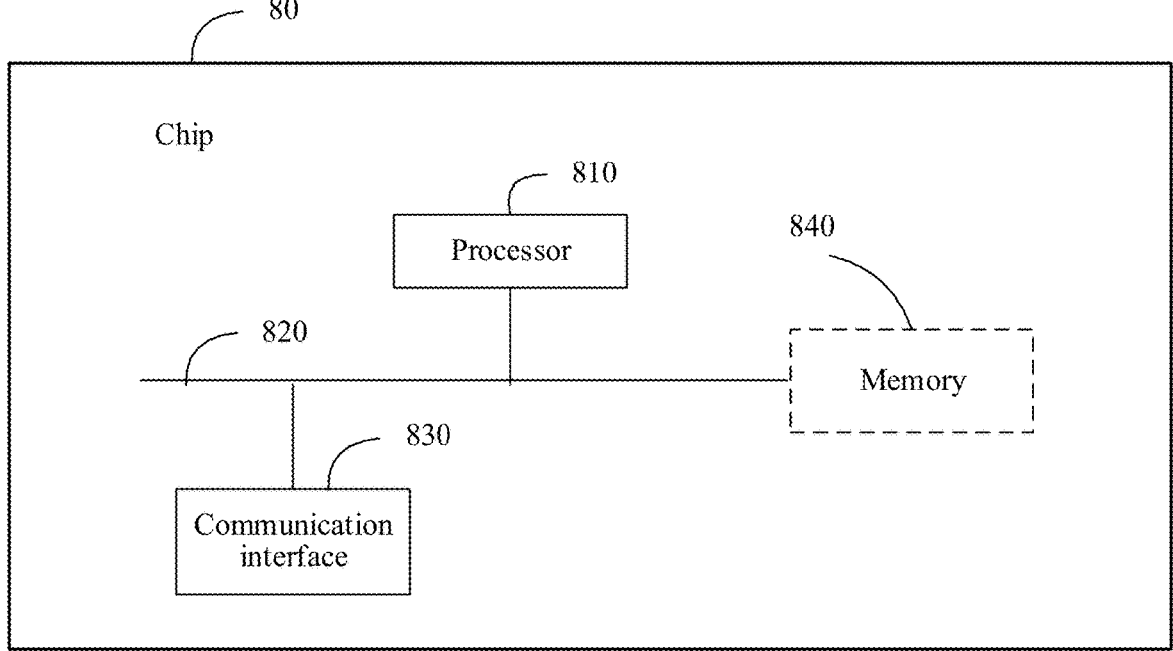
FIG. 8 is a schematic diagram of a hardware structure of a chip according to an embodiment of this application.

FIG. 8 is a schematic diagram of a hardware structure of a chip 80 according to an embodiment of this application. The chip 80 includes one processor or two or more (including two) processors 810 and a communication interface 830. The processor 810 may be coupled to the communication interface 830. In embodiments of this application, connections may include various types of interfaces, transmission lines, buses, or the like. This is not limited in this embodiment. The communication interface 830 is configured to enable the chip 80 to connect to another communication device through a communication link.

Optionally, the chip 80 further includes a memory 840. The memory 840 may be connected to the processor 810 and the communication interface 830, for example, through a communication line 820. The memory 840 may include a read-only memory and a random access memory, and provide operation instructions and data to the processor 810. A part of the memory 840 may further include a non-volatile random access memory (non-volatile random access memory, NVRAM).

In some implementations, the memory 840 stores the following element: an execution module or a data structure, a subset of the execution module or the data structure, or an extended set of the execution module or the data structure.

In embodiments of this application, the operation instructions (where the operation instructions may be stored in an operating system) stored in the memory 840 are invoked to perform corresponding operations.

The processor 810 shown in FIG. 8 may specifically complete the action processed by the communication device in the foregoing method. The memory 840 may be configured to store data, for example, the downlink sub-frame and the target sub-frame. The communication interface 830 may complete the action of interaction with the another device, for example, interaction with user equipment or a terminal device.

An embodiment of this application further provides a computer-readable storage medium. The method described in the foregoing embodiments may be all or partially implemented by software, hardware, firmware, or any combination thereof. If the method is implemented in the software, functions may be stored as one or more instructions or code and on the computer-readable medium or transmitted on the computer-readable medium. The computer-readable medium may include a computer storage medium and a communication medium, and may further include any medium that can transfer a computer program from one place to another. The storage medium may be any target medium that can be accessed by a computer.

In an optional design, the computer-readable medium may include an RAM, a ROM, an EEPROM, a CD-ROM or another optical disc memory or a disk memory, or another magnetic storage device, or any other medium that is used to carry or store required program code in a form of instructions or a data structure and that is accessible by the computer. In addition, any connection is appropriately referred to as a computer-readable medium. For example, if a coaxial cable, an optical fiber cable, a twisted pair, a digital subscriber line (DSL), or wireless technologies (such as infrared, radio, and microwave) are used to transmit software from a website, a server, or another remote source, the coaxial cable, the optical fiber cable, the twisted pair, the DSL, or the wireless technologies such as infrared, radio, and microwave are included in a definition of the medium. Magnetic disks and optical discs used in this specification include a compact disc (CD), a laser disc, an optical disc, a digital versatile disc (DVD), a floppy disk, and a Blu-ray disc. The magnetic disks usually magnetically reproduce data, and the optical discs optically reproduce data through laser light. The foregoing combinations also need to be included within the scope of the computer-readable medium.

An embodiment of this application further provides a computer program product. The method described in the foregoing embodiments may be all or partially implemented by software, hardware, firmware, or any combination thereof. If the methods are implemented in the software, all or some of the methods may be implemented in a form of the computer program product. The computer program product includes one or more computer instructions. When the foregoing computer program instructions are loaded and executed on a computer, all or some of procedures or functions according to the foregoing method embodiments are generated. The computer may be a general-purpose computer, a dedicated computer, a computer network, a base station, a terminal, or another programmable apparatus.

It should be noted that in this application, "of (English: of)", "corresponding (English: corresponding, relevant)", and "corresponding (English: corresponding)" may be interchangeably used sometimes. It should be noted that expressed meanings are consistent when differences are not emphasized.

It should be noted that, in embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a relative concept in a specific manner.

In this application, "at least one" refers to one or more. "A plurality of" refers to two or more than two. In addition, "and/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

The system architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

What is claimed is:

1. A radio frequency channel management method performed by a communication device comprising a first carrier and a second carrier, the method comprising:

obtaining a downlink sub-frame of the communication device;

determining a target sub-frame in the downlink sub-frame, wherein both the first carrier and the second carrier allow shutting down a target radio frequency channel of the communication device in a time period corresponding to the target sub-frame; and shutting down the target radio frequency channel in the time period corresponding to the target sub-frame when traffic corresponding to a data signal carried by the second carrier in a preset time period is large-packet traffic or when traffic corresponding to a data signal carried by the second carrier in a preset time period is large-packet traffic.

2. The method according to claim 1, further comprising:

obtaining a first radio frequency channel that can be shut down and that corresponds to the first carrier; and determining the target radio frequency channel in the first radio frequency channel.

3. The method according to claim 1, wherein the step of determining the target sub- frame in the downlink sub-frame comprises:

determining the target sub-frame based on traffic load corresponding to the first carrier and traffic load corresponding to the second carrier.

4. The method according to claim 1, wherein the step of shutting down the target radio frequency channel of the communication device comprises:

setting a weight of transmit power of the target radio frequency channel to zero in the time period corresponding to the target sub-frame.

5. The method according to claim 1, wherein the first carrier and the second carrier are of different types.

6. A radio frequency channel management method performed by a communication device comprising a first carrier and a second carrier, the method comprising:

obtaining a downlink sub-frame of the communication device;

determining a target sub-frame in the downlink sub-frame, wherein both the first carrier and the second carrier allow shutting down a target radio frequency channel of the communication device in a time period corresponding to the target sub-frame; and skipping shutting down the target radio frequency channel in the time period corresponding to the target sub-frame when traffic corresponding to a data signal carried by the second carrier in a preset time period is large-packet traffic.

7. The method according to claim 6, wherein the communication device communicates with user equipment based on the second carrier, and the method further comprises:

skipping shutting down the target radio frequency channel in the time period corresponding to the target sub-frame when a communication distance between the communication device and the user equipment exceeds a preset distance.

8. A communication device comprising:

a first carrier;

a second carrier;

a processor; and a memory storing executable instructions that, when executed by the processor, cause the communication device to perform operations of:

obtaining a downlink sub-frame of the communication device;

determining a target sub-frame in the downlink sub-frame, wherein both the first carrier and the second carrier allow shutting down a target radio frequency channel of the communication device in a time period corresponding to the target sub-frame; and shutting down the target radio frequency channel in the time period corresponding to the target sub-frame when traffic corresponding to a data signal carried by the second carrier in a preset time period is large-packet traffic or when traffic corresponding to a data signal carried by the second carrier in a preset time period is large-packet traffic.

9. The apparatus according to claim 8, wherein the communication device is caused to perform operations of:

obtaining a first radio frequency channel that can be shut down and that corresponds to the first carrier; and determining the target radio frequency channel in the first radio frequency channel.

10. The apparatus according to claim 8, wherein the operation of determining the target sub-frame in the downlink sub-frame comprises:

determining the target sub-frame based on traffic load corresponding to the first carrier and traffic load corresponding to the second carrier.

11. The apparatus according to claim 8, wherein the operation of shutting down the target radio frequency channel of the communication device comprises:

setting a weight of transmit power of the target radio frequency channel to zero in the time period corresponding to the target sub-frame.

12. The apparatus according to claim 8, wherein the first carrier and the second carrier are of different types.

\* \* \* \* \*